(12) United States Patent
Ma et al.

(10) Patent No.: US 12,035,279 B1
(45) Date of Patent: Jul. 9, 2024

(54) METHODS, DEVICES, AND SYSTEMS FOR DETERMINING LOCATION OF PAGING EARLY INDICATION

(71) Applicant: ZTE Corporation, Shenzhen (CN)

(72) Inventors: Xuan Ma, Shenzhen (CN); Mengzhu Chen, Shenzhen (CN); Jun Xu, Shenzhen (CN); Focai Peng, Shenzhen (CN); Xiaoying Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/601,071

(22) Filed: Mar. 11, 2024

Related U.S. Application Data

(63) Continuation of application No. PCT/CN2022/071235, filed on Jan. 11, 2022.

(51) Int. Cl.
*H04W 68/02* (2009.01)

(52) U.S. Cl.
CPC .................................. *H04W 68/02* (2013.01)

(58) Field of Classification Search
CPC .................................................. H04W 68/02
USPC ........................................................ 455/458
See application file for complete search history.

(56) References Cited

U.S. PATENT DOCUMENTS

2006/0203766 A1    9/2006   Kim et al.

FOREIGN PATENT DOCUMENTS

| CN | 110831125 A | 2/2020 |
|----|-------------|--------|
| EP | 2453710 A1 | 5/2012 |
| WO | WO 2021180206 A1 | 9/2021 |
| WO | WO 2022205096 A1 | 10/2022 |

OTHER PUBLICATIONS

International Search Report and Written Opinion regarding PCT/CN2022/071235 dated Sep. 22, 2022, 7 pages.
MCC Support, "Draft Report of 3GPP TSG RAN WG1 #107-e v0.1.0," 3GPP TSG RAN WG1 Meeting #107bis-e, e-Meeting, R1-220xxxx, Nov. 11-19, 2021, 173 pages.

*Primary Examiner* — Joel Ajayi
(74) *Attorney, Agent, or Firm* — Crowell & Moring LLP

(57) ABSTRACT

The present disclosure describes methods, system, and devices for determining a location of paging early indication (PEI). One method includes receiving, by a user equipment (UE), configuration information of a paging early indication occasion (PEI-O), wherein the configuration information comprises a frame-level offset list and a symbol-level offset list, the frame-level offset list comprises one or more frame-level offset, and the symbol-level offset list comprises one or more symbol-level offset; and detecting, by the UE, a paging early indication (PEI) in the PEI-O, wherein the PEI-O is determined by a frame-level offset from a start of a first paging frame (PF) of at least one PF associated with the PEI-O to a reference point and a symbol-level offset from the reference point to a start of a first physical downlink control channel (PDCCH) monitor occasion of the PEI-O.

8 Claims, 7 Drawing Sheets

400 

```
receiving, by a user equipment (UE), configuration information of a paging early
indication occasion (PEI-O), wherein the configuration information comprises a
frame-level offset list and a symbol-level offset list, the frame-level offset list
comprises one or more frame-level offset, and the symbol-level offset list comprises
one or more symbol-level offset
                                                                              410
```

```
detecting, by the UE, a paging early indication (PEI) in the PEI-O, wherein the PEI-O
is determined by a frame-level offset from a start of a first paging frame (PF) of at
least one PF associated with the PEI-O to a reference point and a symbol-level offset
from the reference point to a start of a first physical downlink control channel
(PDCCH) monitor occasion of the PEI-O.
                                                                              420
```

FIG. 4A

450 sending, by a base station to a user equipment (UE), configuration information of a paging early indication occasion (PEI-O), wherein the configuration information comprises a frame-level offset list and a symbol-level offset list, the frame-level offset list comprises one or more frame-level offset, and the symbol-level offset list comprises one or more symbol-level offset
460 sending, by the base station to the UE, a paging early indication (PEI) in the PEI-O, wherein the PEI-O is determined by a frame-level offset from a start of a first paging frame (PF) of at least one PF associated with the PEI-O to a reference point and a symbol-level offset from the reference point to a start of a first physical downlink control channel (PDCCH) monitor occasion of the PEI-O
470

FIG. 4B

METHODS, DEVICES, AND SYSTEMS FOR DETERMINING LOCATION OF PAGING EARLY INDICATION

CROSS-REFERENCE TO RELATED APPLICATION

This application is a continuation application of PCT International Patent Application No. PCT/CN2022/071235, filed with the China National Intellectual Property Administration, PRC on Jan. 11, 2022, which is herein incorporated by reference in its entirety.

TECHNICAL FIELD

The present disclosure is directed generally to wireless communications. Particularly, the present disclosure relates to methods, devices, and systems for determining a location of paging early indication (PEI).

BACKGROUND

Wireless communication technologies are moving the world toward an increasingly connected and networked society. High-speed and low-latency wireless communications rely on efficient network resource management and allocation among one or more user equipment and one or more wireless access network nodes (including but not limited to base stations). A new generation network is expected to provide high speed, low latency and ultra-reliable communication capabilities and fulfill the requirements from different industries and users.

With the rapid evolution of cellular mobile communication systems, for example in the present wireless telecommunication protocol, a user equipment (UE) may need to monitor a paging occasion (PO) in each paging cycle or paging time window (PTW), so that the UE may obtain a paging message according to the paging occasion. However, under most circumstances, the UE may not have paging messages in all paging cycles, so that actively monitoring paging occasions may result in unnecessary power consumption. This issue/problem may be severe for some UEs with relatively low paging probability, which may detect a larger number of unnecessary paging occasions, causing unnecessarily-high power consumption. A paging early indication (PEI) with indication information before a PO may be used to indicate whether a UE needs to receive a paging physical downlink control channel (PDCCH). This scheme may reduce the power consumption caused by excessive paging reception. One of the issues/problems may be how UEs locate PEIs accurately and reduce power consumption caused by blind detection.

The present disclosure describes various embodiments for determining a location of paging early indication (PEI), addressing at least one of the problems/issues discussed above. The various embodiments in the present disclosure may reduce and/or save power consumption, increase efficiency of monitoring paging occasions, and/or improve accuracy of receiving paging messages, thus improving user experience and/or a technology field in the wireless communication.

SUMMARY

This document relates to methods, systems, and devices for wireless communication, and more specifically, for determining a location of paging early indication (PEI).

In one embodiment, the present disclosure describes a method for wireless communication. The method includes receiving, by a user equipment (UE), configuration information of a paging early indication occasion (PEI-O), wherein the configuration information comprises a frame-level offset list and a symbol-level offset list, the frame-level offset list comprises one or more frame-level offset, and the symbol-level offset list comprises one or more symbol-level offset; and detecting, by the UE, a paging early indication (PEI) in the PEI-O, wherein the PEI-O is determined by a frame-level offset from a start of a first paging frame (PF) of at least one PF associated with the PEI-O to a reference point and a symbol-level offset from the reference point to a start of a first physical downlink control channel (PDCCH) monitor occasion of the PEI-O.

In another embodiment, the present disclosure describes a method for wireless communication. The method includes sending, by a base station to a user equipment (UE), configuration information of a paging early indication occasion (PEI-O), wherein the configuration information comprises a frame-level offset list and a symbol-level offset list, the frame-level offset list comprises one or more frame-level offset, and the symbol-level offset list comprises one or more symbol-level offset; and sending, by the base station to the UE, a paging early indication (PEI) in the PEI-O, wherein the PEI-O is determined by a frame-level offset from a start of a first paging frame (PF) of at least one PF associated with the PEI-O to a reference point and a symbol-level offset from the reference point to a start of a first physical downlink control channel (PDCCH) monitor occasion of the PEI-O.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4A shows a flow diagram of a method for wireless communication.

FIG. 4B shows a flow diagram of a method for wireless communication.

DETAILED DESCRIPTION

Figure 1:
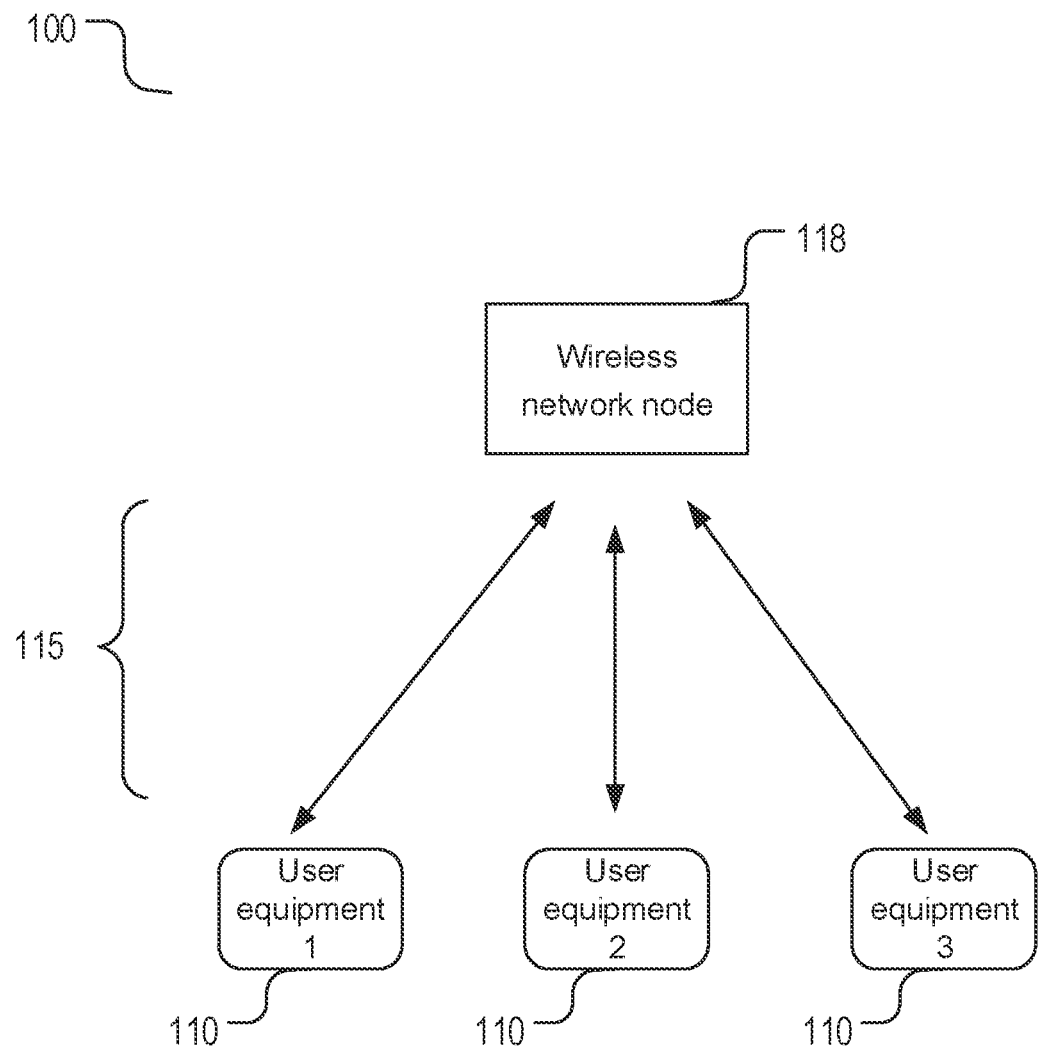
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various methods and devices for determining a location of paging early indication (PEI).

With the rapid evolution of cellular mobile communication systems, for example in the present wireless telecommunication protocol, a user equipment (UE) may need to monitor a paging occasion (PO) in each paging cycle, for example each discontinuous receiving (DRX) cycle, so that the UE may obtain a paging message according to the paging occasion. However, under most circumstances, the UE may not have paging messages in all paging cycles, so that actively monitoring paging occasions may result in unnecessary power consumption. This issue/problem may be severe for some UEs with relatively low paging probability, by which a larger number of unnecessary paging messages may be received, causing unnecessarily high power consumption.

In some implementations, a paging early indication (PEI) with indication information before the PO can indicate whether a UE needs to receive paging physical downlink control channel (PDCCH) in the PO. This may reduce the power consumption caused by paging reception. In some implementations, different PEI location may bring different power saving effects.

In some implementations, one PEI may indicate multiple POs in different PFs. One of the issue/problems may include how to enable the UEs corresponding to different POs to find the same PEI. In some other implementations, different PEI location may bring different power saving gains. Thus, to allow UEs to locate PEIs accurately and reduce power consumption caused by blind detection, one of the issues/problems may include how the UEs locate PEIs.

The present disclosure describes various embodiments for determining a location of paging early indication (PEI), addressing at least one of the problems/issues discussed above. The various embodiments in the present disclosure may reduce and/or save power consumption, increase efficiency of monitoring paging occasions, and/or improve accuracy of receiving paging messages, thus improving user experience and/or a technology field in the wireless communication.

In various embodiments, a UE may monitor one paging occasion (PO) per discontinuous receiving (DRX) cycle (i.e., paging cycle). One Paging Frame (PF) is one Radio Frame (RF) and may contain one or more PO or starting point of a PO. The PF and PO for paging may determined by the following formulae. A system frame number (SFN) for the PF is determined by (SFN+PF_offset)mod T=(T div N)*(UE_ID mod N), and an index (i_s) indicating the index of the PO is determined by i_s=floor (UE_ID/N) mod Ns, wherein T denotes a DRX cycle of the UE; N denotes a number of total paging frames in T; Ns denotes a number of paging occasions for a PF; PF_offset denotes an offset used for PF determination; UE_ID denotes a 5th Generation (5G) system temporary mobile subscription identifier (5G-S-TMSI)mod 1024.

In some other embodiments, a value of N*Ns may determine a number of POs in a DRX cycle, that is a density of POs in the DRX cycle, wherein N is a number of total paging frames in a DRX cycle; and Ns is a number of paging occasions for a PF.

In some other embodiments, a location of PEI may be determined by a frame-level offset and a symbol-level offset. The frame-level offset may be an offset at a frame level from a start of a first paging frame (PF) of at least one PF associated with a paging early indication occasion (PEI-O) to a reference point. The symbol-level offset may be an offset at a symbol level from the reference point to a start of a first physical downlink control channel (PDCCH) monitor occasion of the PEI-O.

FIG. 1 shows a wireless communication system 100 including a wireless network node 118 and one or more user equipment (UE) 110. The wireless network node may include a network base station, which may be a nodeB (NB, e.g., a gNB, a eNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may send high layer signalling to the UE 110. The high layer signalling may include configuration information for communication between the UE and the base station. In one implementation, the high layer signalling may include a radio resource control (RRC) message.

Figure 2:
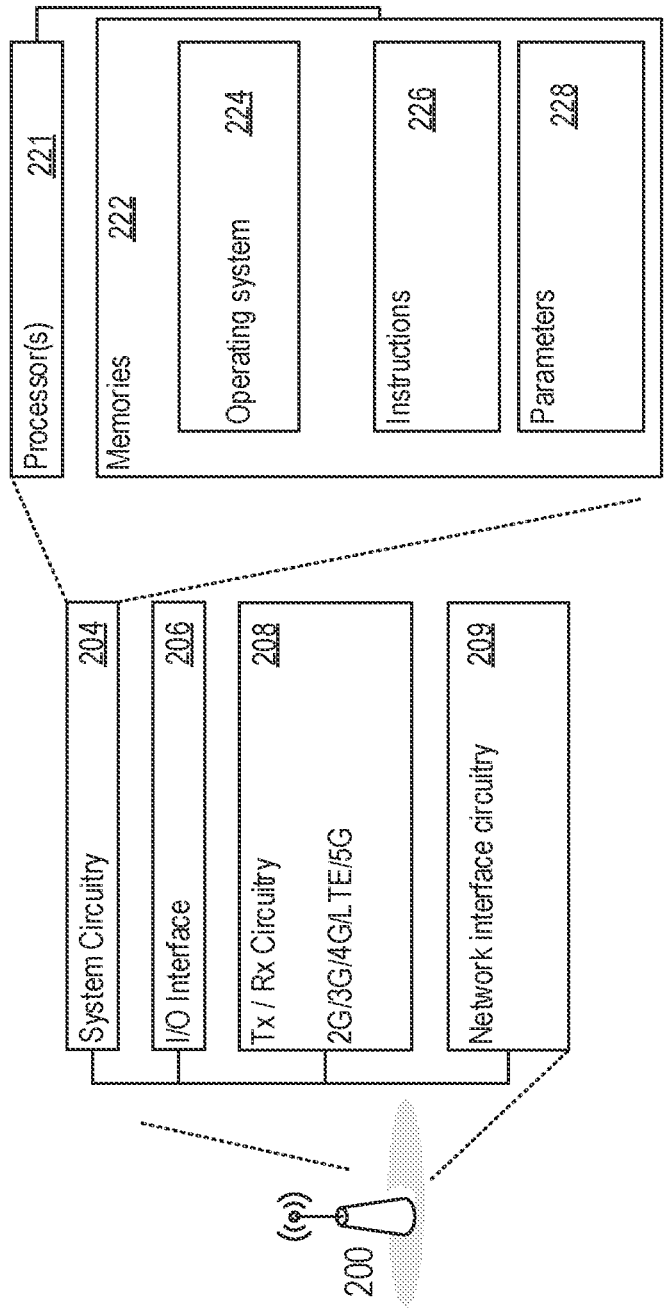
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
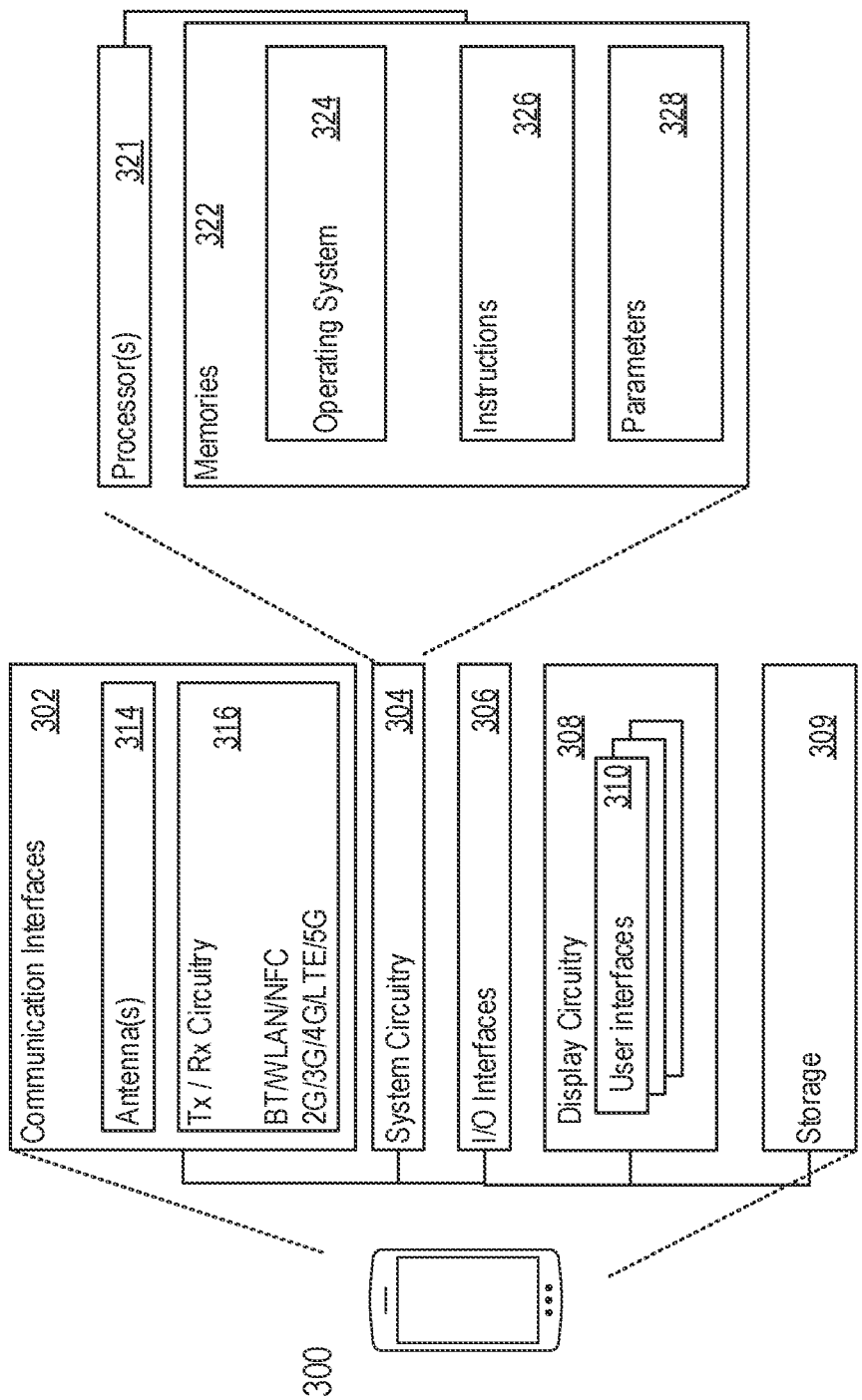
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), 5G, 6G, any further tele-communication generation, and/or any future generation wireless communication standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G, 6G, any further tele-communication generation, or other data that the UE 300 will send, or has received, through the communication interfaces 302. In various implementations, a system power for the UE 300 may be supplied by a power storage device, such as a battery or a transformer.

The present disclosure describes various embodiments, which may be implemented, partly or totally, on the network base station and/or the user equipment described above in FIGS. 2-3.

Referring to FIG. 4A, the present disclosure describes various embodiments of a method 400 for wireless communication. The method 400 may include a portion or all of the following steps: step 410, receiving, by a user equipment (UE), configuration information of a paging early indication occasion (PEI-O), wherein the configuration information comprises a frame-level offset list and a symbol-level offset list, the frame-level offset list comprises one or more frame-level offset, and the symbol-level offset list comprises one or more symbol-level offset; and/or step 420, detecting, by the UE, a paging early indication (PEI) in the PEI-O, wherein the PEI-O is determined by a frame-level offset from a start of a first paging frame (PF) of at least one PF associated with the PEI-O to a reference point and a symbol-level offset from the reference point to a start of a first physical downlink control channel (PDCCH) monitor occasion of the PEI-O.

Referring to FIG. 4B, the present disclosure describes various embodiments of another method 450 for wireless communication. The method 450 may include a portion or all of the following steps: step 460, sending, by a base station to a user equipment (UE), configuration information of a paging early indication occasion (PEI-O), wherein the configuration information comprises a frame-level offset list and a symbol-level offset list, the frame-level offset list comprises one or more frame-level offset, and the symbol-level offset list comprises one or more symbol-level offset;

and/or step 470, sending, by the base station to the UE, a paging early indication (PEI) in the PEI-O, wherein the PEI-O is determined by a frame-level offset from a start of a first paging frame (PF) of at least one PF associated with the PEI-O to a reference point and a symbol-level offset from the reference point to a start of a first physical downlink control channel (PDCCH) monitor occasion of the PEI-O.

In some implementations, a UE may monitor the paging indication (PEI) in the PEI occasions (PEI-O). In some other implementations, the PEI may be carried on a downlink control information (DCI), for example, DCI format 2_7. The PEI-O location may be determined by a reference point and an symbol-level offset from the reference point to the start of the first PDCCH monitor occasion (MO) of the PEI-O. The reference point may be the start of a reference frame determined by a frame-level offset from the start of the first paging frame (PF) of the PF(s) associated with the PEI-O.

In various embodiments, the determination of the first PF is based on the following: a PF where the UE monitors a paging occasion (PO), a system frame number (SFN) of the UE's PF, which is noted as SFN_PO, an index of the PO among at least one PO associated with the PEI, which is noted as $i_{PO}$, a paging cycle, which is noted as T, a number of total paging frames in a paging cycle, which is noted as N, a number of POs in a PF, which is noted as $N_s$, an index of the PO among one or more PO in the PF, which is noted as i_s, a UE identifier (UE_ID), a number of POs associated with the PEI, which is noted as $N_{PO}^{PEI}$, or an offset used for determining the PF, which is noted as PF_offset.

In some other implementations, the first PF is determined by an SFN of the first PF based on $i_{PO}$ and $N_s$, wherein: in response to $i_{PO} \leq N_s$, the first PF is determined as a UE's PF; and/or in response to $i_{PO} > N_s$, the first PF is determined as a former PF before the UE's PF, wherein $i_{PO}$ is the index of the PO among at least one PO associated with the PEI, Ns is the number of POs in a PF, a distance between the former PF and the UE's PF is T/N radio frames.

In some implementations, the first PF is determined by: SFN_firstPF=SFN_PO−[floor($i_{PO}/N_s$)*(T/N)], wherein: the SFN_firstPF is an SFN of the first PF, SFN_PO satisfies (SFN_PO+PF_offset)mod T=(T div N)*(UE_ID mod N), $i_{PO}$ satisfies $i_{PO}$=((UE_ID mod N)×Ns+i_s)mod $N_{PO}^{PEI}$, the floor(x) is a floor function outputting a greatest integer less than or equal to x, and the mod( ) is a modulo operation outputting a remainder of a division.

In some other implementations, the first PF is determined by an SFN of the first PF according to (SFN_firstPF+PF_offset)mod($N_{PO}^{PEI}$/Ns*(T/N))=0, and/or SFN_firstPF=X*($N_{PO}^{PEI}$/Ns*(T/N))−PF_offset, where: the SFN_firstPF is the SFN of the first PF, and the mod( ) is a modulo operation outputting a remainder of a division.

In some other implementations, the SFN of the first PF corresponding to the PEI that the UE monitors may be equal to or smaller than the SFN of the UE's PF, and a distance between the first PF corresponding to the PEI that the UE monitors and the UE's PF is equal to or smaller than T/N radio frames.

In some other implementations, the first PF is determined by an SFN of the first PF according to (SFN_firstPF+PF_offset)mod T=floor((UE_ID mod N)/($N_{PO}^{PEI}$/Ns))*($N_{PO}^{PEI}$/Ns)*(T/N), wherein the SFN_firstPF is the SFN of the first PF, the floor(x) is a floor function outputting a greatest integer less than or equal to x, and the modO is a modulo operation outputting a remainder of a division.

In various embodiments, the first PF may be determined by at least one of the following: the PF where the UE monitors the PO; SFN_PO: the system frame number (SFN) of the UE's PF, and in some implementations, the UE's PF that is determined by SFN for the PF is determined by: (SFN+PF_offset)mod T=(T div N)*(UE_ID mod N); i_PO: the index of the PO among the POs associated with the PEI; T: the paging cycle; N: the number of total paging frames in paging cycle; Ns: the number of paging occasions for a PF; i_s: the index of the PO among the POs in one PF; a UE_ID; $N_{PO}^{PEI}$: the number of POs associated with the PEI; and/or PF_offset: an offset used for PF determination. In some implementations, a PO associated with a PEI means that a PO corresponding to a PEI. In some other implementations, a PO associated with a PEI means that whether one or more UEs monitor the PO or not are indicated by the PEI.

In some implementations, the first PF may be determined by the SFN of the UE's PF, the index of the PO among the POs associated with the PEI, the number of paging occasions for a PF, the paging cycle and number of total paging frames in paging cycle.

In some other implementations, the SFN of the first PF may be determined by SFN_firstPF=SFN_PO−[floor(i_PO/Ns)*(T/N)], where the SFN_firstPF is the SFN of the first PF, the SFN_PO is the SFN of the UE's PF, which may be determined by (SFN_PO+PF_offset)mod T=(T div N)*(UE_ID mod N), T is the paging cycle, N is the number of total paging frames in paging cycle, Ns is the number of paging occasions for a PF, i_PO is the relative PO index, with starting value of 0, among the POs associated with the PEI. In some other implementations, the i_PO may be determined by i_PO=((UE_ID mod N)×Ns+i_s)mod $N_{PO}^{PEI}$.

In some other implementations, the SFN of the first PF may be determined by SFN_firstPF=(1024+SFN_PO−(floor (i_PO/Ns)*(T/N)))mod 1024, where the SFN_PO is the SFN of the UE's PF, T is the paging cycle, N is the number of total paging frames in paging cycle, Ns is the number of paging occasions for a PF, i_PO is the relative PO index, with starting value of 0, among the POs associated with the PEI. In some other implementations, the i_PO may be determined by i_PO=((UE_ID mod N)×Ns+i_s) mod $N_{PO}^{PEI}$.

In some other implementations, the first PF is determined by the index of the PO among the POs associated with the PEI (i_PO) and the number of POs for a PF(Ns). When the value of the i_PO is smaller than or equal to the Ns, the first PF is the UE's PF; and/or when the value of the i_PO is larger than the Ns, the first PF is the former PF before the UE's PF. The distance between the former PF and the UE's PF may be T/N radio frames (RF). The SFN of the former PF may be equal to the SFN of the UE's PF minus T/N. In some implementations, the distance between the former PF and the UE's PF is the distance between the start of the former PF and the start of the UE's PF. In some other implementations, the distance between the former PF and the UE's PF is the distance between the slot of the former PF and the slot of the UE's PF with the same slot number.

In some other implementations, the first PF may be described as $$\text{the first } PF = \begin{cases} \text{the } UE\text{'s } PF, \text{ if } i\_PO \leq N_s \\ \text{the former } PF \text{ before the } Ue\text{'s } PF, \text{ if } i\_PO > N_s \end{cases}.$$

In some other implementations, the first PF may be determined by the offset used for PF determination, the number of POs associated with the PEI, the number of paging occasions for a PF, the paging cycle and number of total paging frames in paging cycle.

In some other implementations, the first PF may satisfy a condition that (SFN_firstPF+PF_offset)mod($N_{PO}^{PEI}$/Ns*(T/N))=0, where SFN_firstPF is the SFN of the first PF, the PF_offset is the offset used for PF determination, the $N_{PO}^{PEI}$ is the number of POs associated with the PEI, Ns is the number of paging occasions for a PF, N is the number of total paging frames in paging cycle, T is the paging cycle.

In some other implementations, the first PF may satisfy the condition that SFN_firstPF=X*($N_{PO}^{PEI}$/Ns*(T/N))+PF_offset or SFN_firstPF=(X*($N_{PO}^{PEI}$/Ns*(T/N))+PF_offset)mod 1024, where X is {0, 1, 2, . . . , (N/T*1024)/($N_{PO}^{PEI}$/Ns)}.

In some other implementations, the first PF may satisfy the condition that SFN_firstPF=X*($N_{PO}^{PEI}$/Ns*(T/N))−PF_offset or SFN_firstPF=(1024+X*($N_{PO}^{PEI}$/Ns*(T/N))−PF_offset)mod 1024, where X is {0, 1, 2, . . . , (N/T*1024)/($N_{PO}^{PEI}$/Ns)}.

For a UE, the SFN of the first PF corresponds to the PEI UE monitored may be equal to or smaller than the SFN of the UE's PF, and/or the distance between the first PF corresponding to the PEI UE monitored and the UE's PF may be equal to or smaller than T/N radio frames.

In some other implementations, the first PF may be determined by the offset used for PF determination, the UE_ID, the number of POs associated with the PEI, the number of paging occasions for a PF, the paging cycle and number of total paging frames in paging cycle.

In some other implementations, the first PF may satisfy the condition that (SFN_firstPF+PF_offset)mod T=floor((UE_ID mod N)/($N_{PO}^{PEI}$/Ns))*($N_{PO}^{PEI}$/Ns)*(T/N).

In some other implementations, the first PF may satisfy the condition that SFN_firstPF mod T=floor((UE_ID mod N)/($N_{PO}^{PEI}$/Ns))*($N_{PO}^{PEI}$/Ns)*(T/N)+PF_offset, or SFN_firstPF mod T=(floor((UE_ID mod N)/($N_{PO}^{PEI}$/Ns))*($N_{PO}^{PEI}$/Ns)*(T/N)+PF_offset)mod T.

In some other implementations, the first PF may satisfy the condition that SFN_firstPF mod T=floor((UE_ID mod N)/($N_{PO}^{PEI}$/Ns))*($N_{PO}^{PEI}$/Ns)*(T/N)−PF_offset, or SFN_firstPF mod T=(floor((UE_ID mod N)/($N_{PO}^{PEI}$/Ns))*($N_{PO}^{PEI}$/Ns)*(T/N)−PF_offset+T)mod T.

In some other implementations, the first PF may satisfy the condition that SFN_firstPF=floor((UE_ID mod(1024*N/T))/($N_{PO}^{PEI}$/Ns))*($N_{PO}^{PEI}$/Ns)*(T/N)+PF_offset, or SFN_firstPF=(floor((UE_ID mod(1024*N/T))/($N_{PO}^{PEI}$/Ns))*($N_{PO}^{PEI}$/Ns)*(T/N)+PF_offset)mod 1024.

In some other implementations, the first PF may satisfy the condition that SFN_firstPF=floor((UE_ID mod(1024*N/T))/($N_{PO}^{PEI}$/Ns))*($N_{PO}^{PEI}$/Ns)*(T/N)−PF_offset, or SFN_firstPF=(floor((UE_ID mod(1024*N/T))/($N_{PO}^{PEI}$/Ns))*($N_{PO}^{PEI}$/Ns)*(T/N)+PF_offset+1024)mod 1024.

In various embodiments, one value is configured for the frame-level offset; and/or a number of at least one candidate of the frame-level offset list is determined based on at least one of the following: a number of POs associated with one PEI, a number of PFs in one paging cycle, or a number of POs in one PF.

In some implementations, the frame-level offset corresponding to the UE monitoring a $(i\_s+1)^{th}$ PO is a (floor$((i\_s+1)/N_{PO}^{PEI}))^{th}$ value of a frame-level offset list; or the frame-level offset corresponding to the UE monitoring a $(i\_PO+1)^{th}$ PO is a $(i\_PO+1)^{th}$ value of the frame-level offset list.

In some other implementations, a range of the frame-level offset is determined based on at least one of the following: a synchronization signal block (SSB) transmission period, a type of the UE, a type of a paging cycle or a discontinuous receiving (DRX) cycle, a value of a paging cycle or a DRX cycle, or a UE capability.

Figure 5:
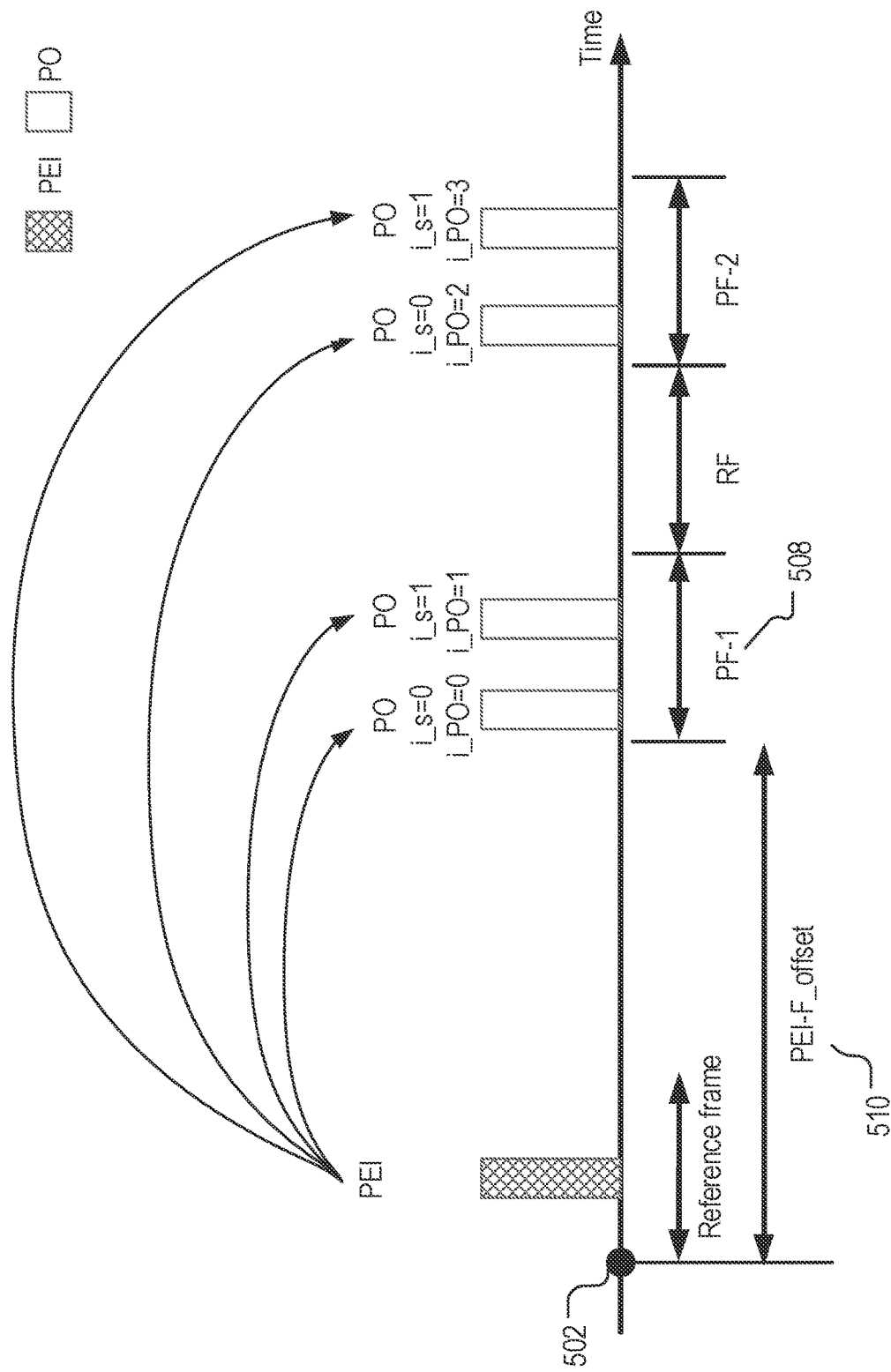
FIG. 5 shows an example of an exemplary embodiment for wireless communication.

In various embodiment in the present disclosure, referring to FIG. 5, a frame-level offset (PEI-F_offset, 510) may be an offset from a reference point (502) of a reference frame to the start of a first paging frame (PF-1, 508) of paging frames (PF-1 and PF-2) associated with a PEI. In various embodiments in the present disclosure, the "first" paging frame (e.g., PF-1 in FIG. 5) of paging frames may refer the "earliest" paging frame of the paging frames (e.g., PF-1 and PF-2 in FIG. 5) associated with one PEI in the time domain, not merely "one" paging frame of the paging frames. As shown in FIG. 5, the PF-1 includes two POs: one PO with i_s=0 and i_PO=0 and the other PO with i_s=1 and i_PO=1; and/or the PF-2 includes two POs: one PO with i_s=0 and i_PO=2 and the other PO with i_s=1 and i_PO=3.

In some implementations, one value may be configured for the frame-level offset.

In some other implementations, there may be a list of frame-level offsets (also referred as the frame-level offset list). A number of the candidates of the frame-level offset list may be determined based on at least one of the following: a number of POs associated with one PEI; a number of PFs in one paging cycle, and/or a number of POs in one PF.

In some other implementations, the number of the candidate values of the frame-level offset list may be equal to the number of POs associated with one PEI.

In some other implementations, the frame-level offset corresponding to the $(i\_PO+1)^{th}$ PO may be the $(i\_PO+1)^{th}$ value of the frame-level offset list.

In some other implementations, the reference frame of the PEI corresponding to the $(i\_PO+1)^{th}$ PO may be the $(i\_PO+1)^{th}$ value of the frame-level offset list.

In some other implementations, the number of the candidate values of the frame-level offset list may be equal to the number of PEIs in one frame or equal to the number of PEIs corresponding to one reference point.

In some other implementations, the SFN value of the PEI is not larger than the SFN value of the first SFN or the SFN value of the paging frame that UE monitors.

In some other implementations, the frame-level offset corresponding to a (i_s+1)th PO may be the (floor((i_s+1)/$N_{PO}^{PEI}$))th value of the frame-level offset list.

In some other implementations, the first PDCCH monitoring occasion number of the PEI corresponding to a (i_s+1)th PO may be the (floor((i_s+1)/$N_{PO}^{PEI}$))th value of the symbol-level offset list.

In some other implementations, the range of the frame-level offset is determined by at least one of the following: the SSB transmission period; the UE type; the UE capability; a type of paging cycle or DRX cycle; a value of paging cycle or DRX cycle.

In some other implementations, the minimum value of the frame-level offset may be zero.

In some other implementations, when the value of the frame-level offset may be equal to 0, the PEI may be located before the paging PDCCH monitoring occasion in the frame. That is, a symbol-level offset of the PEI may be smaller than the value of the firstPDCCH-MonitoringOccasionOfPO. The parameter firstPDCCH-MonitoringOccasionOfPO may be used to determine the first PDCCH monitor occasion of the paging PDCCH.

In some other implementations, a minimum value of the frame-level offset may be a positive integer. That is, the frame-level offset may not be 0.

In some other implementations, a maximum value of the frame-level offset may be determined by at least one of the following: the SSB transmission period; the UE type; the UE capability; a type of paging cycle or DRX cycle; and/or a value of paging cycle or DRX cycle.

In some other implementations, the frame-level offset is one value. The value of the frame-level offset is determined by the periodicity of the SSB. For example, the value is larger than or equal to N times of SSB transmission periods, where N is a positive integer. For example, N=1, N=2, N=3, N=5.

In some other implementations, the frame-level offset is a range which contains multiple values, and the maximum value of the frame-level offset meet the condition that the maximum value of the frame-level offset is larger than or equal to N times of SSB periods, where N is a positive integer. For example, N=1, N=2, N=3, and/or N=5. In some other implementations, the range of the frame-level offset is {0, 1, 2, . . . , N*SSB periods}.

In some other implementations, the frame-level offset is one value. The value of the frame-level offset is determined by the UE type. For example, for the non-reduced capability (non-RedCap) UE, the value of the frame-level offset is 6, for the reduced capability (RedCap) UE, the value of the frame-level offset is 10 ms.

In some other implementations, the frame-level offset is a range which contains multiple values, and the range or maximum value of the frame-level offset is determined by the UE type or DRX type. For example, for the non-RedCap UE, the maximum value of the frame-level offset is 6, for the RedCap UE, the maximum value of the frame-level offset is 10, the unit of the frame-level offset is radio frame, that is 10 ms. In some other implementations, the range of the frame-level offset is {0, 1, 2, . . . , X}, and X is determined by the UE type or DRX type.

In some other implementations, the frame-level offset is determined by the periodicity of SSB and the UE type.

In some other implementations, the frame-level offset is one value. The value of the frame-level offset is determined by the periodicity of SSB and the UE type.

In some other implementations, the value of the frame-level offset is larger than or equal to N times of SSB periods, where N is a positive integer and the value of N is different for different UE type. For example, for non-RedCap UE, the N is equal to 2, for RedCap UE, the N is equal to 5. That is the value of the frame-level offset is larger than or equal to 4 for non-RedCap UE and the value of the frame-level offset is larger than or equal to 10 for RedCap UE.

In some other implementations, the frame-level offset is a range which contains multiple values, and the range or maximum value of the frame-level offset is determined by the periodicity of SSB and the UE type.

In some other implementations, the maximum value of the frame-level offset is determined by the periodicity of SSB and the UE type.

In some other implementations, the maximum value of the frame-level offset is larger than or equal to N times of SSB periods, where N is a positive integer and the value of N is different for different UE type or DRX type. For example, for non-RedCap UE, the N is equal to 3, for RedCap UE, the N is equal to 5. The maximum value of the frame-level offset is larger than or equal to 6 for an non-RedCap UE and the value of the frame-level offset is larger than or equal to 10 for RedCap UE. The unit of the frame-level offset is frame, that is, 10 ms. In some other implementations, the range of the frame-level offset is {0, 1, 2, . . . , N*SSB period}, and N is determined by the UE type or DRX type.

In some other implementations, the range or the maximum value of the frame-level offset is determined by a type of paging cycle or DRX cycle. In some embodiments, the range or the maximum value of the frame-level offset for UEs configured e-DRX (extended DRX) cycle is larger than the UEs with general DRX or paging cycle configuration. For example, for the UE with general DRX or paging cycle the range of the frame-level offset is 0-6, while for the UE with e-DRX configuration the range of the frame-level offset is 0-20.

In some other implementations, the maximum value of the frame-level offset for the UE with e-DRX configuration is m times of that of the UE with general DRX configuration. The m may be a positive integer.

Figure 6:
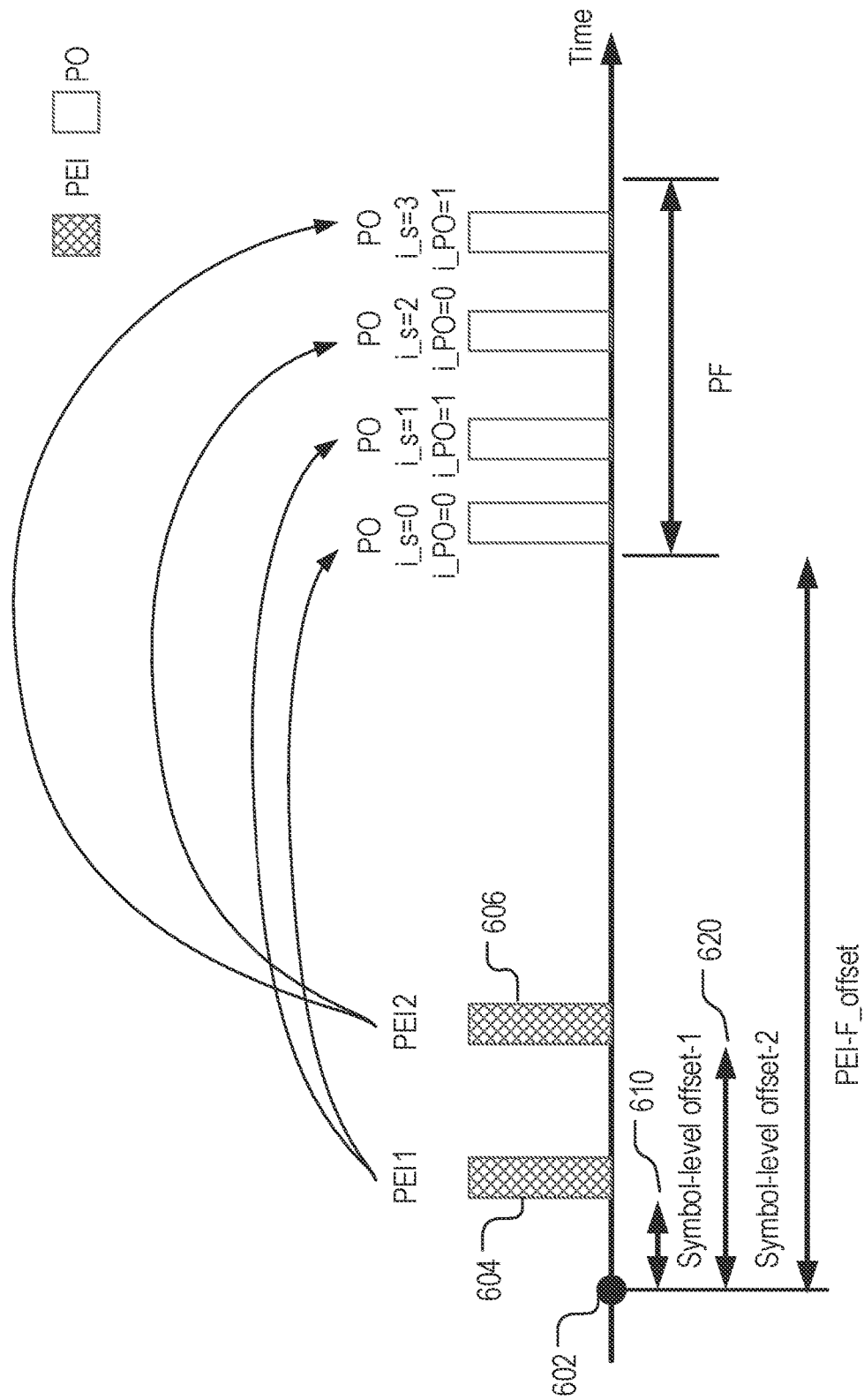
FIG. 6 shows an example of an exemplary embodiment for wireless communication.

In various embodiments in the present disclosure, referring to FIG. 6, a symbol-level offset (610) may be an offset from a reference point (602) to a start of a first PDCCH monitoring occasion of PEI (PEI1, 604). In some embodiments, the symbol-level offset may be provided by the high layer parameter, e.g., firstPDCCH-MonitoringOccasionOfPEI-O. In various embodiments in the present disclosure, the "first" PDCCH monitoring occasion of PEI (e.g., PEI1 in FIG. 6) of one or more PDCCH monitoring occasions of PEIs may refer the "earliest" PDCCH monitoring occasion of PEI among the PDCCH monitoring occasions of PEIs in the time domain, not merely "one" PDCCH monitoring occasion of PEI.

In some implementations, there may be a list of symbol-level offsets (or referred as a symbol-level offset list), which includes one or more symbol-level offset, for example referring to FIG. 6, the symbol-level offset-1 (610) corresponding to the PEI1 (604) and the symbol-level offset-2 (620) corresponding to the PEI2 (606). As shown in FIG. 6, the paying frame (PF) includes four POs: a first PO with i_s=0 and i_PO=0, a second PO with i_s=1 and i_PO=1, a third PO with i_s=2 and i_PO=0, and a fourth PO with i_s=3 and i_PO=1.

In various embodiments, a number of at least one candidate of the symbol-level offset list is determined based on at least one of the following: a number of PEIs in one frame, a number of POs associated with the PEI, or a number of POs in the PF.

In some implementations, the symbol-level offset corresponding to a $(i\_s+1)^{th}$ PO is a $(floor((i\_s+1)/N_{PO}^{PEI}))^{th}$ value of a symbol-level offset list; or the symbol-level offset corresponding to a $(i\_PO+1)^{th}$ PO is a $(i\_PO+1)^{th}$ value of the symbol-level offset list.

In some other implementations, a range of the symbol-level offset is determined based on at least one of the following: a sub-carrier spacing (SCS) of the UE, a number of total paging frames in a paging cycle, or the paging cycle.

In some other implementations, a maximum value of the symbol-level offset is determined based on at least one of the following: a sub-carrier spacing (SCS) of the UE, a number of total paging frames in a paging cycle, or the paging cycle.

In some other implementations, the range of the symbol-level offset is determined based on the SCS of the UE, and in response to the SCS of the UE being 15*m KHz, the range of the symbol-level offset is determined as from 0 to (140*m-1), inclusive, wherein $m=2^n$, and n is a non-negative integer.

In some other implementations, the range of the symbol-level offset is determined based on the SCS of the UE and the number of total paging frames in the paging cycle.

In some other implementations, in response to the SCS of the UE being 15*m KHz and the number of total paging frames in the paging cycle being equal to the paging cycle, the range of the symbol-level offset is determined as from 0 to (140*m-1), inclusive, wherein m=2$^n$, and n is a non-negative integer; in response to the SCS of the UE being 15*m KHz and the number of total paging frames in the paging cycle being equal to a half of the paging cycle, the range of the symbol-level offset is determined as from 0 to (140*m*2-1), inclusive; in response to the SCS of the UE being 15*m KHz and the number of total paging frames in the paging cycle being equal to a quarter of the paging cycle, the range of the symbol-level offset is determined as from 0 to (140*m*4-1), inclusive; in response to the SCS of the UE being 15*m KHz and the number of total paging frames in the paging cycle being equal to an eighth of the paging cycle, the range of the symbol-level offset is determined as from 0 to (140*m*8-1), inclusive; and in response to the SCS of the UE being 15*m KHz and the number of total paging frames in the paging cycle being equal to a sixteenth of the paging cycle, the range of the symbol-level offset is determined as from 0 to (140*m*16-1), inclusive. In some other implementations, the n may be one of 0, 1, 2, 3, 4, 5, or 6; and thus, the m may be one of 1, 2, 4, 8, 16, 32, or 64.

In various embodiments, the symbol-level offset list is a list including one or more symbol-level offset, and a number of the candidate values of the symbol-level offset list may be determined by at least one of the following: the number of PEIs in one frame, for example, the PEIs in one frame means that the PEIs correspond to the same reference frame, or the PEIs in one frame means that the PEIs correspond to the same reference point; a number of POs associated with one PEI($N_{PO}^{PEI}$); and/or a number of POs for a PF(Ns).

In some implementations, the number of the candidate values of the symbol-level offset list may be equal to the number of PEIs in one frame or equal to the number of PEIs corresponding to one reference point.

In some other implementations, the number of the candidate values of the symbol-level offset list may be equal to ceil (Ns/$N_{PO}^{PEI}$). That is, when the number of the POs associated with one PEI is larger than the number of POs in one PF, one symbol-level offset value is enough. When the number of the POs associated with one PEI is smaller than the number of POs in one PF, the symbol-level offset will contains (Ns/$N_{PO}^{PEI}$) values.

In some other implementations, the symbol-level offset corresponding to the UE monitored the (i_s+1)$^{th}$ PO may be the (floor((i_s+1)/$N_{PO}^{PEI}$))$^{th}$ value of the symbol-level offset list.

In some other implementations, the first PDCCH monitoring occasion number of the PEI corresponding to the UE monitored the (i_s+1)$^{th}$ PO may be the (floor((i_s+1)/$N_{PO}^{PEI}$))$^{th}$ value of the symbol-level offset list.

In some other implementations, the number of the candidate values of the symbol-level offset may be equal to the number of POs associated with one PEI.

In some other implementations, the symbol-level offset corresponding to the UE monitored the (i_PO+1)$^{th}$ PO may be the (i_PO+1)$^{th}$ value of the symbol-level offset list.

In some other implementations, the first PDCCH monitoring occasion number of the PEI corresponding to the UE monitored the (i_PO+1)$^{th}$ PO may be the (i_PO+1)$^{th}$ value of the symbol-level offset list.

In some other implementations, the range of the symbol-level offset is determined by at least one of the following: a sub-carrier space (SCS) of the UE; and/or N: a number of total paging frames in paging cycle.

In some other implementations, the range of the symbol-level offset is determined by the SCS of the UE. In response to the SCS of the UE being 15*m KHz, the range of the symbol-level offset is determined as from 0 to (140*m-1), inclusive, wherein m=2$^n$, and n is a non-negative integer. For example, the symbol-level offset can be determined by: when the SCS is 15 KHz, the range of the symbol-level offset can be 0-139 symbols; when the SCS is 30 KHz, the range of the symbol-level offset can be 0-279 symbols; when the SCS is 60 KHz, the range of the symbol-level offset can be 0-559 symbols; and/or when the SCS is 120 KHz, the range of the symbol-level offset can be 0-1119 symbols.

In some other implementations, the reference point is the starting point of a reference frame, so the position of the reference point may be accurate to a radio frame level. On the basis of the reference point, the symbol-level offset further locates the PEI to a symbol level, and the first monitor occasion of PEI may be any symbol within the reference frame.

In some other implementations, the range of the symbol-level offset is determined by the SCS of the UE and the number of total paging frames in paging cycle. In response to the SCS of the UE being 15*m KHz and the number of total paging frames in the paging cycle being equal to the paging cycle, the range of the symbol-level offset is determined as from 0 to (140*m-1), inclusive, wherein m=2$^n$, and n is a non-negative integer; in response to the SCS of the UE being 15*m KHz and the number of total paging frames in the paging cycle being equal to a half of the paging cycle, the range of the symbol-level offset is determined as from 0 to (140*m*2-1), inclusive; in response to the SCS of the UE being 15*m KHz and the number of total paging frames in the paging cycle being equal to a quarter of the paging cycle, the range of the symbol-level offset is determined as from 0 to (140*m*4-1), inclusive; in response to the SCS of the UE being 15*m KHz and the number of total paging frames in the paging cycle being equal to an eighth of the paging cycle, the range of the symbol-level offset is determined as from 0 to (140*m*8-1), inclusive; and/or in response to the SCS of the UE being 15*m KHz and the number of total paging frames in the paging cycle being equal to a sixteenth of the paging cycle, the range of the symbol-level offset is determined as from 0 to (140*m*16-1), inclusive.

For example, the symbol-level offset may be determined as: when the SCS is 15 KHz and N=T, the range of the symbol-level offset can be 0-139 symbols; when the SCS is 30 KHz and N=T or the SCS is 15 KHz and N=T/2, the range of the symbol-level offset can be 0-279 symbols; when the SCS is 60 KHz and N=T or the SCS is 30 KHz and N=T/2 or the SCS is 15 KHz and N=T/4, the range of the symbol-level offset can be 0-559 symbols; when the SCS is 120 KHz and N=T or the SCS is 60 KHz and N=T/2 or the SCS is 30 KHz and N=T/4 or the SCS is 15 KHz and N=T/8, the range of the symbol-level offset can be 0-1119 symbols; when the SCS is 120 KHz and N=T/2 or the SCS is 60 KHz and N=T/4 or the SCS is 30 KHz and N=T/8 or the SCS is 15 KHz and N=T/16, the range of the symbol-level offset can be 0-2239 symbols; when the SCS is 120 KHz and N=T/4 or the SCS is 60 KHz and N=T/8 or the SCS is 30 KHz and N=T/16, the range of the symbol-level offset can be 0-4479 symbols; when the SCS is 120 KHz and N=T/8 or the SCS is 60 KHz and N=T/16, the range of the symbol-level offset can be 0-8959 symbols; and/or when the SCS is 120 KHz and N=T/16, the range of the symbol-level offset can be 0-17919 symbols.

In some other implementations, the N is the number of total paging frames in paging cycle, and T is the paging cycle. For different values of N, the distance between two PFs may be different.

In some other implementations, the maximum value of the symbol-level offset may be equal to the maximum number of the symbols between two PFs.

In various embodiments, a transmission power of the PEI is associated with at least one of the following: a high layer parameter; a transmission power of a secondary synchronization signal (SSS); or a transmission power of a paging PDCCH.

In some implementations, the transmission power of the PEI is determined by: in response to the high layer parameter being configured, the high layer parameter, and/or in response to the high layer parameter not being configured, a ratio of a demodulation reference signal (DMRS) energy per resource element (EPRE) of the PEI to a SSS EPRE within -X dB and X dB, wherein X is a positive integer.

In some other implementations, the transmission power of the PEI is determined by a ratio of a DMRS EPRE of the PEI to a DMRS EPRE of the paging PDCCH within -Y dB and Y dB, wherein Y is a positive integer.

In some other implementations, the transmission power of the PEI may be configured by a high layer parameter.

In some other implementations, the transmission power of the PEI may be determined by the transmission power of the SSS. For example, the ratio of the demodulation reference signal (DMRS) energy per resource element (EPRE) of the PEI to SSS EPRE is within -X dB and X dB, for example, X=8. Here in various embodiment in the present disclosure, dB may be referred to a decibel and equal to one tenth of a bel (B), which expresses a ratio of two values of a power or root-power quantity on a logarithmic scale.

In some other implementations, the transmission power of the PEI may be configured by a high layer parameter if configured, otherwise, the ratio of the DMRS EPRE of the PEI to SSS EPRE is within -X dB and X dB, for example, X=8.

In some other implementations, the DMRS EPRE of the PEI may be equal to the DMRS EPRE of the paging PDCCH. In some other embodiments, the ratio of the DMRS EPRE of the PEI to the DMRS EPRE of the paging PDCCH is within -X dB and X dB, for example, X=3.

The present disclosure describes methods, apparatus, and computer-readable medium for wireless communication. The present disclosure addressed the issues with determining a location of paging early indication (PEI). The methods, devices, and computer-readable medium described in the present disclosure may facilitate the performance of wireless communication by determining a location of paging early indication (PEI), thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
  receiving, by a user equipment (UE), configuration information of a paging early indication occasion (PEI-O), wherein the configuration information comprises a frame-level offset and a symbol-level offset list, and the symbol-level offset list comprises one or more symbol-level offset;
  determining, by the UE, the PEI-O based on a reference point and a symbol-level offset, wherein:
    the reference point is determined by the frame-level offset from a start of a first paging frame (PF) of at least one PF associated with the PEI-O, and
    a start of a first physical downlink control channel (PDCCH) monitor occasion of the PEI-O is the symbol-level offset from the reference point; and
  detecting, by the UE, a paging early indication (PEI) in the PEI-O, wherein:
  the first PF is determined by SFN_firstPF=SFN_PO−[floor($i_{PO}/N_s$)*(T/N)], wherein:
    a PF where the UE monitors a paging occasion (PO),
    a system frame number (SFN) of the UE's PF, which is noted as SFN_PO,
    an index of the PO among at least one PO associated with the PEI, which is noted as $i_{PO}$,
    a paging cycle, which is noted as T,
    a number of total paging frames in a paging cycle, which is noted as N,
    a number of POs in a PF, which is noted as $N_s$,
    an index of the PO among one or more PO in the PF, which is noted as i_s,
    a UE identifier (UE_ID),
    a number of POs associated with the PEI, which is noted as $N_{PO}^{PEI}$,
    an offset used for determining the PF, which is noted as PF_offset,
    the SFN_firstPF is an SFN of the first PF,
    SFN_PO satisfies (SFN_PO+PF_offset)mod T=(T div N)*(UE_ID mod N),
    $i_{PO}$ satisfies $i_{PO}$=((UE_ID mod N)×Ns+i_s)mod $N_{PO}^{PEI}$,
    the floor(x) is a floor function outputting a greatest integer less than or equal to x, and
    the mod( ) is a modulo operation outputting a remainder of a division;
  the range of the symbol-level offset is determined as from 0 to (140*m-1), inclusive, in response to a sub-carrier spacing (SCS) of the UE being 15*m KHz and a number of total paging frames in the paging cycle being equal to the paging cycle, wherein m=$2^n$, and n is a non-negative integer;
  the range of the symbol-level offset is determined as from 0 to (140*m*2-1), inclusive, in response to the SCS of the UE being 15*m KHz and the number of total paging frames in the paging cycle being equal to a half of the paging cycle;

the range of the symbol-level offset is determined as from 0 to (140*m*4-1), inclusive, in response to the SCS of the UE being 15*m KHz and the number of total paging frames in the paging cycle being equal to a quarter of the paging cycle;

the range of the symbol-level offset is determined as from 0 to (140*m*8-1), inclusive, in response to the SCS of the UE being 15*m KHz and the number of total paging frames in the paging cycle being equal to an eighth of the paging cycle; and the range of the symbol-level offset is determined as from 0 to (140*m*16-1), inclusive, in response to the SCS of the UE being 15*m KHz and the number of total paging frames in the paging cycle being equal to a sixteenth of the paging cycle.

2. The method according to claim 1, wherein:
a number of at least one candidate of the symbol-level offset list is determined based on at least one of the following:
 a number of POs associated with the PEI, and
 a number of POs in a PF.

3. The method according to claim 1, wherein:
a transmission power of the PEI is determined by:
 in response to a high layer parameter not being configured, a ratio of a demodulation reference signal (DMRS) energy per resource element (EPRE) of the PEI to a secondary synchronization signal (SSS) EPRE within −8 dB and 8 dB.

4. A method for wireless communication, comprising:
sending, by a base station to a user equipment (UE), configuration information of a paging early indication occasion (PEI-O), wherein the configuration information comprises a frame-level offset and a symbol-level offset list, and the symbol-level offset list comprises one or more symbol-level offset;
determining, by the base station, the PEI-O based on a reference point and a symbol-level offset, wherein:
 the reference point is determined by the frame-level offset from a start of a first paging frame (PF) of at least one PF associated with the PEI-O, and
 a start of a first physical downlink control channel (PDCCH) monitor occasion of the PEI-O is the symbol-level offset from the reference point; and
sending, by the base station to the UE, a paging early indication (PEI) in the PEI-O, wherein:
the first PF is determined by SFN_firstPF=SFN_PO−[floor($i_{PO}$/$N_s$)*(T/N)], wherein:
 a PF where the UE monitors a paging occasion (PO),
 a system frame number (SFN) of the UE's PF, which is noted as SFN_PO,
 an index of the PO among at least one PO associated with the PEI, which is noted as $i_{PO}$,
 a paging cycle, which is noted as T,
 a number of total paging frames in a paging cycle, which is noted as N,
 a number of POs in a PF, which is noted as $N_s$,
 an index of the PO among one or more PO in the PF, which is noted as i_s,
 a UE identifier (UE_ID),
 a number of POs associated with the PEI, which is noted as $N_{PO}^{PEI}$,
 an offset used for determining the PF, which is noted as PF_offset,
 the SFN_firstPF is an SFN of the first PF, SFN_PO satisfies (SFN_PO+PF_offset)mod T= (T div N)*(UE_ID mod N),
$i_{PO}$ satisfies $i_{PO}$=((UE_ID mod N)×Ns+i_s)mod $N_{PO}^{PEI}$,
the floor(x) is a floor function outputting a greatest integer less than or equal to x, and
the mod( ) is a modulo operation outputting a remainder of a division;

the range of the symbol-level offset is determined as from 0 to (140*m-1), inclusive, in response to a sub-carrier spacing (SCS) of the UE being 15*m KHz and a number of total paging frames in the paging cycle being equal to the paging cycle, wherein m=$2^n$, and n is a non-negative integer;

the range of the symbol-level offset is determined as from 0 to (140*m*2-1), inclusive, in response to the SCS of the UE being 15*m KHz and the number of total paging frames in the paging cycle being equal to a half of the paging cycle;

the range of the symbol-level offset is determined as from 0 to (140*m*4-1), inclusive, in response to the SCS of the UE being 15*m KHz and the number of total paging frames in the paging cycle being equal to a quarter of the paging cycle;

the range of the symbol-level offset is determined as from 0 to (140*m*8-1), inclusive, in response to the SCS of the UE being 15*m KHz and the number of total paging frames in the paging cycle being equal to an eighth of the paging cycle; and the range of the symbol-level offset is determined as from 0 to (140*m*16-1), inclusive, in response to the SCS of the UE being 15*m KHz and the number of total paging frames in the paging cycle being equal to a sixteenth of the paging cycle.

5. The method according to claim 4, wherein:
a number of at least one candidate of the symbol-level offset list is determined based on at least one of the following:
 a number of POs associated with the PEI, and
 a number of POs in a PF.

6. The method according to claim 4, wherein:
a transmission power of the PEI is determined by:
 in response to a high layer parameter not being configured, a ratio of a demodulation reference signal (DMRS) energy per resource element (EPRE) of the PEI to a secondary synchronization signal (SSS) EPRE within −8 dB and 8 dB.

7. A user equipment (UE) comprising:
a memory storing instructions; and
a processor in communication with the memory, wherein, when the processor executes the instructions, the processor is configured to cause the UE to perform:
 receiving configuration information of a paging early indication occasion (PEI-O), wherein the configuration information comprises a frame-level offset and a symbol-level offset list, and the symbol-level offset list comprises one or more symbol-level offset,
 determining the PEI-O based on a reference point and a symbol-level offset, wherein:
  the reference point is determined by the frame-level offset from a start of a first paging frame (PF) of at least one PF associated with the PEI-O, and
  a start of a first physical downlink control channel (PDCCH) monitor occasion of the PEI-O is the symbol-level offset from the reference point, and
 detecting a paging early indication (PEI) in the PEI-O, wherein:

the first PF is determined by SFN_firstPF=SFN_PO−[floor($i_{PO}$/$N_s$)*(T/N)], wherein:
- a PF where the UE monitors a paging occasion (PO),
- a system frame number (SFN) of the UE's PF, which is noted as SFN_PO,
- an index of the PO among at least one PO associated with the PEI, which is noted as $i_{PO}$,
- a paging cycle, which is noted as T,
- a number of total paging frames in a paging cycle, which is noted as N,
- a number of POs in a PF, which is noted as $N_s$,
- an index of the PO among one or more PO in the PF, which is noted as i_s,
- a UE identifier (UE_ID),
- a number of POs associated with the PEI, which is noted as $N_{PO}^{PEI}$,
- an offset used for determining the PF, which is noted as PF_offset,
- the SFN_firstPF is an SFN of the first PF,
- SFN_PO satisfies (SFN_PO+PF_offset)mod T=(T div N)*(UE_ID mod N),
- $i_{PO}$ satisfies $i_{PO}$=((UE_ID mod N)×Ns+i_s)mod $N_{PO}^{PEI}$,
- the floor(x) is a floor function outputting a greatest integer less than or equal to x, and
- the mod( ) is a modulo operation outputting a remainder of a division;

the range of the symbol-level offset is determined as from 0 to (140*m-1), inclusive, in response to a sub-carrier spacing (SCS) of the UE being 15*m KHz and a number of total paging frames in the paging cycle being equal to the paging cycle, wherein m=$2^n$, and n is a non-negative integer;

the range of the symbol-level offset is determined as from 0 to (140*m*2-1), inclusive, in response to the SCS of the UE being 15*m KHz and the number of total paging frames in the paging cycle being equal to a half of the paging cycle;

the range of the symbol-level offset is determined as from 0 to (140*m*4-1), inclusive, in response to the SCS of the UE being 15*m KHz and the number of total paging frames in the paging cycle being equal to a quarter of the paging cycle;

the range of the symbol-level offset is determined as from 0 to (140*m*8-1), inclusive, in response to the SCS of the UE being 15*m KHz and the number of total paging frames in the paging cycle being equal to an eighth of the paging cycle; and the range of the symbol-level offset is determined as from 0 to (140*m*16-1), inclusive, in response to the SCS of the UE being 15*m KHz and the number of total paging frames in the paging cycle being equal to a sixteenth of the paging cycle.

8. A base station comprising:

a memory storing instructions; and a processor in communication with the memory, wherein, when the processor executes the instructions, the processor is configured to cause the base station to perform:

- sending, to a user equipment (UE), configuration information of a paging early indication occasion (PEI-O), wherein the configuration information comprises a frame-level offset and a symbol-level offset list, and the symbol-level offset list comprises one or more symbol-level offset,
- determining the PEI-O based on a reference point and a symbol-level offset, wherein:
  - the reference point is determined by the frame-level offset from a start of a first paging frame (PF) of at least one PF associated with the PEI-O, and
  - a start of a first physical downlink control channel (PDCCH) monitor occasion of the PEI-O is the symbol-level offset from the reference point, and
- sending, to the UE, a paging early indication (PEI) in the PEI-O, wherein:

the first PF is determined by SFN_firstPF=SFN_PO−[floor($i_{PO}$/$N_s$)*(T/N)], wherein:
- a PF where the UE monitors a paging occasion (PO),
- a system frame number (SFN) of the UE's PF, which is noted as SFN_PO,
- an index of the PO among at least one PO associated with the PEI, which is noted as $i_{PO}$,
- a paging cycle, which is noted as T,
- a number of total paging frames in a paging cycle, which is noted as N,
- a number of POs in a PF, which is noted as $N_s$,
- an index of the PO among one or more PO in the PF, which is noted as i_s,
- a UE identifier (UE_ID),
- a number of POs associated with the PEI, which is noted as $N_{PO}^{PEI}$,
- an offset used for determining the PF, which is noted as PF_offset,
- the SFN_firstPF is an SFN of the first PF,
- SFN_PO satisfies (SFN_PO+PF_offset)mod T=(T div N)*(UE_ID mod N),
- $i_{PO}$ satisfies $i_{PO}$=((UE_ID mod N)×Ns+i_s)mod $N_{PO}^{PEI}$,
- the floor(x) is a floor function outputting a greatest integer less than or equal to x, and
- the mod( ) is a modulo operation outputting a remainder of a division;

the range of the symbol-level offset is determined as from 0 to (140*m-1), inclusive, in response to a sub-carrier spacing (SCS) of the UE being 15*m KHz and a number of total paging frames in the paging cycle being equal to the paging cycle, wherein m=$2^n$, and n is a non-negative integer;

the range of the symbol-level offset is determined as from 0 to (140*m*2-1), inclusive, in response to the SCS of the UE being 15*m KHz and the number of total paging frames in the paging cycle being equal to a half of the paging cycle;

the range of the symbol-level offset is determined as from 0 to (140*m*4-1), inclusive, in response to the SCS of the UE being 15*m KHz and the number of total paging frames in the paging cycle being equal to a quarter of the paging cycle;

the range of the symbol-level offset is determined as from 0 to (140*m*8-1), inclusive, in response to the SCS of the UE being 15*m KHz and the number of total paging frames in the paging cycle being equal to an eighth of the paging cycle; and the range of the symbol-level offset is determined as from 0 to (140*m*16-1), inclusive, in response to the SCS of the UE being 15*m KHz and the number of total paging frames in the paging cycle being equal to a sixteenth of the paging cycle.

* * * * *